Figure 1:
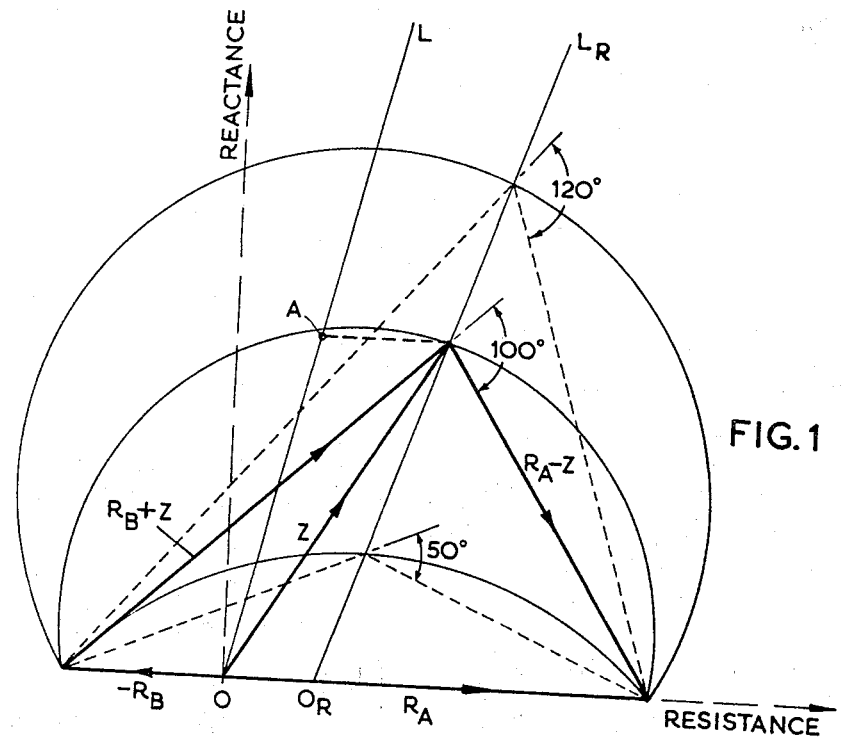

ically propelled train.

United States Patent Office 3,408,564
Patented Oct. 29, 1968

3,408,564
ELECTRICAL APPARATUS INCLUDING A PAIR OF REPLICA IMPEDANCES FOR MEASURING DISTANCES ALONG A LOADED ELECTRICAL LINE
Hans Hoel, Oslo, Norway, assignor to The English Electric Company Limited, London, England, a British company
Filed Feb. 1, 1965, Ser. No. 429,216
Claims priority, application Great Britain, Feb. 5, 1964, 4,863/64
5 Claims. (Cl. 324—52)

This invention relates to electrical apparatus for measuring the distance to a load point along an electrical line, and more particularly relates to the condition for which the load point is an earth fault affecting an electrical power supply line.

From one aspect, the present invention consists in apparatus for measuring from a reference datum the distance to a load point along an electrical line having a predetermined load locus on an R–X operating characteristic of said apparatus, comprising means for monitoring the current and voltage of the line and applying one of these quantities to a replica impedance defining a predetermined impedance vector intersecting the said datum on the characteristic, means for deriving from the monitored quantities two like vectorial components each dependent on said impedance vector and at least one of which is dependent also on the ratio of the monitored voltage and current signals in a manner such as to intersect the load locus at said load point, and a phase comparator for determining the phase difference between the two components whereby to derive therefrom a measurement of the said distance.

In a preferred embodiment, the two vectorial quantities are currents each dependent on both the said impedance vector and the ratio of the monitored voltage and current signals, the impedance vector being purely resistive with the reference datum being the origin of the operating characteristic.

Apparatus according to this invention is particularly suitable in protective relaying applications where the load locus is predetermined for earth faults affecting an electrical supply line, the distance measured then being the distance to the fault. In this instance, the apparatus is operative to utilize the essential data for the measurement in the time interval, usually one or two cycles, between the instant when the earth fault is sensed by the relay and the instant at which the faulted section is isolated by a protective circuit-breaker, and the actual indication of the measurement may be recorded after such isolation. The measurement effected by apparatus according to this invention is substantially independent of frequency, and of D.C. components of the power line, and furthermore a measure of line impedance (Z) may readily be derived since this vector is essentially dependent on the distance measurement.

Figure 2:
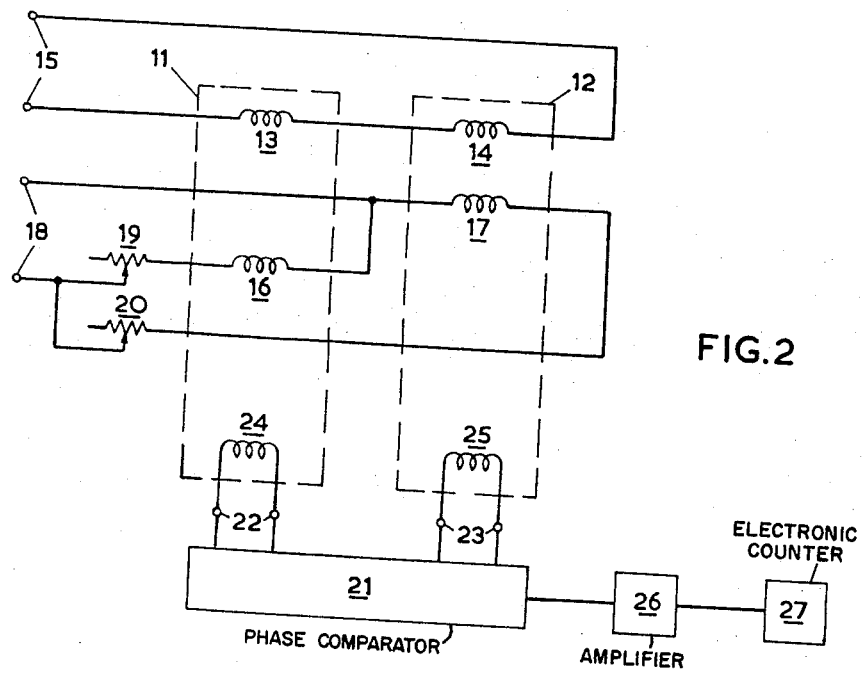

It is to be understood, however, that the invention is not necessarily limited to power lines and fault distance measurement and alternatively it can be employed to sense to position of any particular load, for example, it may be employed to detect the position of an electri An electrical apparatus in accordance with this invention for measuring the distance between a datum and an earth fault on an electrical power line will now be described, by way of example, with reference to an accompanying drawing in which:

FIG. 1 shows graphically an impedance diagram illustrating the impedance vectors of the power line and various components of the apparatus; and FIG. 2 shows a circuit diagram of the apparatus according to this invention.

Referring now to the drawings, in FIG. 1 OL represents the locus of the impedance of a healthy electrical power line extending from a datum O, and $O_RL_R$ represents the locus of the impedance of the same line including an added impedance due to the maximum expected arc and earth resistance which may occur whenever there is an earth fault on the line. Two predetermined resistance vectors of magnitudes $R_A$ and $R_B$ (replica impedances) are chosen and the phase angle, for example 100°, (50° and 120° are also shown) between two vectors $(R_A-Z)$ and $R_B+Z)$, where Z is the effective impedance vector of the line under fault conditions, represents a specific distance along the line from the datum O to the fault, i.e. a distance equivalent to OA when the phase angle is 100°.

In FIGURE 2, the apparatus includes the transformers 11 and 12 having primary windings 13 and 14, respectively, which are connected in series across input terminals 15, and further primary windings 16 and 17 of these transformers are connected in parallel across input terminals 18 which, in turn, are in series with potentiometers 19 and 20.

A phase comparator 21 has input terminals 22 and 23 coupled to secondary windings 24 and 25 of the two transformers for comparing the phase relationship between the induced signals on these windings, and an amplifier 26 is connected between this phase comparator 21 and an electronic counter 27.

In operation, the potentiometers 19 and 20 are initially adjusted to exhibit resistances in accordance with a selected length of the electrical power line defining a boundary for the distance protection, i.e. any one of the arcs which intercept the line OL. Now, whenever an electrical earth fault occurs on the line, control means (not shown) render the apparatus responsive for a predetermined time interval to a signal dependent on the fault current (I) in the line applied to input terminals 15, and to a signal dependent on the fault voltage (V) of the line applied to input terminals 18. The phase comparator 21 is arranged to measure the phase angle between the two signals developed on its windings 24, 25 which are currents given by $$i_1 = K_1(I - V/R(19))$$
$$= K_1(I.R(19) - V)/R(19)$$
$$= K_1I(R(19) - V/I)/R(19)$$
$$= K_AI(R_A - Z)$$

and $$i_2 = K_2(I + V/R(20)) = K_BI(R_B + Z)$$

thus representing the impedance vectors $(R_A-Z)$ and $(R_B+Z)$. The resulting output signal from the phase comparator is then applied to the amplifier 26 and this amplified signal is arranged to control the number of counts undertaken by the electronic counter, this number being dependent on the phase angle between the vectors $R_A-Z$ and $R_B+Z$ and consequently a measure of the distance to the earth fault from the datum. If the fault is at a distance within the boundary of protection, then protective action may be taken.

It is to be understood that this invention is not limited to the particular arrangement described and illustrated. For example, the resistance values represented by vector $R_A$ and $R_B$ (FIG. 1) may be replaced by any suitable impedance vectors provided that those impedance vectors do not have either the same angular positions and magnitudes or angular positions "in-line" with the vector Z.

Furthermore, the phase comparator may be arranged instead to measure the phase angle between the vectors $R_A$ and $(R_A-Z)$. This modification however has a disadvantage in so far as the measurement of phase angle is now much more dependent on the value of the arc resistance occurring during an electrical fault, thus rendering the distance measurements less accurate than before. In addition, although an electronic counter has been described as the output device, a capacitor may alternatively be used, charged by the output from the phase comparator, so that the resultant voltage across this capacitor becomes a measure of the distance to the electrical earth fault on the line. This arrangement would be advantageous where several power lines, at a sub-station for example, incorporate such an electrical apparatus, so that an electrostatic voltmeter may be used to measure the resultant voltage associated with each power line.

What I claim as my invention and desire to secure by Letters Patent is:

1. Apparatus for measuring from a reference datum the distance to a load point along an electrical line having a predetermined load locus on an R–X operating characteristic of said apparatus, comprising a pair of replica impedances defining predetermined impedance vectors intersecting the said datum on the characteristic, means for monitoring the current and voltage of the line and applying one of these quantities to said replica impedances, means for deriving from the monitored quantities two like vectorial components each dependent on said impedance vector and at least one of which is dependent also on the ratio of the monitored voltage and current signals in a manner such as to intersect the load locus at said load point, and a phase comparator for determining the phase difference between the two components whereby to derive therefrom a measurement of the said distance.

2. Apparatus according to claim 1, wherein the two vectorial quantities are each dependent on both the said impedance vector and the ratio of the monitored voltage and current signals.

3. Apparatus according to claim 2, wherein the reference datum is the origin of the operating characteristic and the impedance vector is purely resistive.

4. Apparatus according to claim 3, wherein the two like vectorial quantities are currents, one being dependent on the sum of the resistive vector extending from one side of said origin and the ratio of the monitored voltage and current signals and the other being dependent on the difference between the resistive vector extending from the opposite side of the origin and the said ratio.

5. Apparatus according to claim 1, wherein the load locus is predetermined for earth faults in an electrical power supply line.

No references cited.

RUDOLPH V. ROLINEC, *Primary Examiner.*

G. R. STRECKER, *Assistant Examiner.*